US006681051B1

(12) United States Patent
Hoppe et al.

(10) Patent No.: US 6,681,051 B1
(45) Date of Patent: Jan. 20, 2004

(54) ARRANGEMENT FOR TRANSFORMING PICTURE DATA

(75) Inventors: Dirk Hoppe, Hamburg (DE); Detlef Götting, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/556,546

(22) Filed: Apr. 24, 2000

(30) Foreign Application Priority Data

Apr. 24, 1999 (DE) ........................ 199 18 662

(51) Int. Cl.[7] ............................. G06K 9/36
(52) U.S. Cl. ................... 382/240; 382/232; 382/248
(58) Field of Search ............................. 382/240, 248, 382/232, 263, 264; 381/103, 93, 95, 107

(56) References Cited

U.S. PATENT DOCUMENTS 5,506,910 A * 4/1996 Miller et al. ............... 381/103
6,201,897 B1 * 3/2001 Nixon ....................... 382/248

OTHER PUBLICATIONS

Andrew et al., "Coding Gain and Spatial Localisation Properties of Discrete Wavelet Transform Filter Banks for Image Coding", IEEE International Conference, Image Processing, vol. 3, Nov. 1994, pps. 348–352.*
Andrew et al., "Comparison of "Wavelet" Filters and Sub-band Analysis Structures for Still Image Compression", IEEE International Conference on Acoustics, Speech and Signal Processing, vol. 5, Apr. 1994, pps. V–589–V592.*
B.M. Gordon et al; "A 1.2MW Video–Rate 2–D Color Subband Decoder", IEEE Journal of Solid–State Circuits, IEEE In. New York, USA, vol. 30, No. 12, Dec. 1, 1995, pp. 1510–1516, XP000557257.

(List continued on next page.)

Primary Examiner—Anh Hong Do
(74) Attorney, Agent, or Firm—Steven R. Biren (57) ABSTRACT

In an arrangement for transforming picture data while using a method of two-dimensional hierarchic sub-band segmentation, particularly a two-dimensional Discrete Wavelet Transformation (2-D DWT), in which pictures, possibly in a plurality of planes, are segmented into sub-bands by means of filtering, a minimal storage space, a minimal bus load and an optimal 2-D DWT transformation ensure that a picture memory (41) is provided in which the data of a picture are stored prior to the start of the first transformation plane and in which the data of a further sub-band to be transformed are stored after the first transformation plane, in which process the data of the picture are partially overwritten, in that the data of a possible further sub-band to be segmented are stored in the picture memory (41) after every further transformation plane, in that a sub-band memory (44) is provided in which, after a transformation process of a plane, the data gained during this transformation of those sub-bands which are no longer to be segmented in further transformation planes are stored, which data of said sub-band are stored adjacent to each other and in which sub-band data determined in previous transformation planes and possibly already stored in the sub-band memory (44) are not overwritten, in that, in the transformation planes, the data of the picture or the sub-band data stored in the last transformation plane are read from the picture memory, which data are read in blocks (32) comprising a basic block (33) having a size corresponding to the picture section or sub-band to be transformed, and a frame (34) surrounding said picture section and having a width corresponding to half the maximum filter depth of the filters (12, 13, 16, 17, 20, 21) used for the transformation, and in that all basic blocks (33) combined cover all pixels of the picture or sub-band data in the picture memory (41).

6 Claims, 4 Drawing Sheets

OTHER PUBLICATIONS

G. Lafruit et al; "Reduction of the Memory Requirements for the VLSI Implementation of the 2D–Inverse Fast Wavelet Transform, Using a Space–Filling Curve", Electronics, Circuits, and Systems, 1996. ICECS'96, Proceedings of the Third IEEE International Conference on Rodos, Greece, Oct. 13–16, 1996, New York, USA, pp. 836–839, XP010217251.

T.C. Denk et al; "Calculation of Minimum Number of Registers in 2–D Discrete Wavelet Transforms Using Lapped Block Processing", Circuits and Systems, 1994. ISCAS'94, 1994 IEEE International Symposium on London, UK May 30–Jun. 2, 1994, New York, USA, pp. 77–80, XP010143141.

* cited by examiner

ARRANGEMENT FOR TRANSFORMING PICTURE DATA

BACKGROUND OF THE INVENTION

In digital photography of single pictures, i.e. motionless still pictures, there is the problem that the required data quantities are very large. This particularly applies when the resolution in digital photography is to approximate that of chemical photography. A known standard for data compression of still pictures is the JPEG standard. This standard does not achieve sufficiently large data reduction rates and, moreover, has the drawback that a data reduction in fixed picture blocks of, for example, 8×8 pixels is performed, which in the case of strong compression can be recognized as artefacts in the reconstructed picture.

To achieve higher compression rates, the Discrete Wavelet Transformation, referred hereinafter as DWT, is known. It has proved to be an efficient method in picture coding and compression. In wavelet transformation of the picture data, so-called wavelet coefficients or sub-bands are generated which can be subsequently quantized and entropy-encoded. The resultant compressed data stream may be used for transmission or storage. The DWT is the basis for future compression standards such as, for example, JPEG 2000 and is an alternative to the known Discrete Cosine Transform (DCT). In picture processing, the so-called two-dimensional Discrete Wavelet Transformation, hereinafter referred to as 2-D DWT, is used. This may be understood to be a consecutive application of a one-dimensional wavelet transformation in the horizontal and vertical directions.

The following aspects are essentially known from the state of the art.

On the one hand, the 2-D DWT can be performed by way of a complete, twice consecutive application of a simple DWT in the horizontal and vertical directions. However, the result is the necessity of buffering the data of the sub-bands between the first and the second transformation stage; thus a considerable memory volume is required. Furthermore, the bus load to and from which the data are copied is increased by at least a factor of 2.

Moreover, it is possible to perform a direct 2-D DWT in which the transformation is performed in one step. It is true that the bus load is reduced thereby but this poses the problem that a comparatively large part of the picture must be simultaneously available for transformation, so that it must be internally stored when it is being processed. In the state of the art, line memories or other memories are used for this purpose. This involves the problem that the size of the internal buffer memories borders on the maximum picture resolution to be processed and that these buffer memories are required as additional memories.

When the transformation is performed in a multiple, iterative way, in which the single sub-bands determined in a transformation operation are buffered time and again, the required memory volume for the initial picture is increased by approximately one-fourth. The sub-pictures are then rewritten into the picture memory. The picture memory must then, however, be implemented for the higher bit depth. Since only picture data, which are no longer necessary for further transformations, can be overwritten when the sub-pictures are being rewritten into the picture memory, the sub-pictures can be stored in the memory in a strongly fragmented form only. A possible subsequent re-assortment considerably increases the bus load, the memory space required for buffering and the computation time.

SUMMARY OF THE INVENTION

It is an object of the invention to provide an arrangement for transforming picture data which is suitable for the two-dimensional Discrete Wavelet Transformation and generates a minimum load of the memory bus, minimizing the overall required memory space, while the resolution of the picture to be processed is not limited by internal register sizes and its architecture provides a transformation without any losses.

According to the invention, this object is solved in that a picture memory is provided in which the data of a picture are stored prior to the start of the first transformation plane and in which the data of a further sub-band to be transformed are stored after the first transformation plane, in which process the data of the picture are partially overwritten, in that the data of a possible further sub-band to be segmented are stored in the picture memory after every further transformation plane, in that a sub-band memory is provided in which, after a transformation process of a plane, the data gained during this transformation of those sub-bands which are no longer to be segmented in further transformation planes are stored, which data of said sub-band are stored adjacent to each other and in which sub-band data determined in previous transformation planes and possibly already stored in the sub-band memory are not overwritten, in that, in the transformation planes, the data of the picture or the sub-band data stored in the last transformation plane are read from the picture memory, which data are read in blocks comprising a basic block having a size corresponding to the picture section or sub-band to be transformed, and a frame surrounding said picture section and having a width corresponding to half the maximum filter depth of the filters used for the transformation, and in that all basic blocks combined cover all pixels of the picture or sub-band data in the picture memory.

In the arrangement according to the invention, two memories are provided, namely one picture memory and one sub-band memory. The picture memory is provided to take up picture data of the picture to be transformed before the start of the first transformation plane. In every subsequent transformation plane, the sub-band to be further transformed is written into this picture memory. Since the original picture and the sub-band data stored in the picture memory during the previous transformation planes are no longer required for the subsequent transformation planes, the data of the picture or the data of the sub-band of the previous transformation plane can be overwritten. Thus, this picture memory can be dimensioned in such a way that, as far as its size is concerned, it is adequately dimensioned for taking up the original picture data. Consequently, no additional storage quantity is required in the picture memory for those data, to be stored in each transformation plane, of that sub-band which is to be further transformed.

After each transformation process of a plane, the data, gained during this transformation, of those sub-bands which are not to be subjected to a further transformation are stored in the sub-band memory. The data can then be stored adjacent to each other and can be stored in an ordered way or in the desired way in the sub-band memory so that no reassortment is required prior to reading the sub-band data.

When the transformations are being performed in the relevant transformation planes, not all data of the picture or of the sub-band stored in the picture memory and to be further transformed are read from the picture memory, but these data are read in blocks only and the transformation is performed for data of these blocks. However, to ensure that this block structure does not influence the transformation process, i.e. no block structure or similar disturbances appear in the reconstructed picture, the blocks are formed in such a way that they comprise a basic block having a size corresponding to the part of the picture or the sub-band to be transformed. This basic block thus comprises that part of the picture or sub-band which is to be transformed. Additionally, this basic block is surrounded by a frame which comprises so many pixels towards all sides that it has the maximum half filtering depth of the filters used in the transformation process. It is thereby ensured that the transformation process which is applied to the entire block is performed in such a way that the transformation can be performed for the data of the basic block without any disturbing effects by the block. The transformation for the pixels in the basic blocks is thus not influenced at all by the block structure and is therefore ideal.

As a result, it is achieved that a transformation in blocks can be performed so that the internal storage quantity for the transformation process can be reduced, but that this transformation in blocks does not influence the actual transformation process and particularly that no disturbances or block structures are visible in the reconstructed picture.

It is achieved by means of the arrangement according to the invention that storage of data of the sub-bands is possible without any additional re-assortment of data and that there is no storage fragmentation. Only a minimal memory access with a minimum bus load is required. No additional buffer memory is required for the further sub-band to be transformed because it can be taken care of by the picture memory without having to enlarge this memory. Moreover, reading of the pictures to be processed is not limited by the sizes of internal registers because these are absent. Due to the block-wise transformation, it is true that memory space within the arrangement is saved but that no additional errors or artefacts are produced.

In accordance with an embodiment of the invention as defined in claim 2, the picture or sub-band to be transformed is segmented into the blocks within which the transformation is to be performed, such that the basic blocks are adjacent to each other. This is necessary because a valid transformation can only be performed for the data within the basic blocks. Furthermore, the blocks are arranged in a plurality of rows or scanning lines.

In the application of the arrangement for a two-dimensional Discrete Wavelet Transformation, hereinafter referred to as 2-D DWT, the arrangement is particularly advantageous because no additional storage space is required in the picture memory for restoring that LL sub-band which is to be further transformed, and because the other sub-bands of each transformation plane which are not further to be transformed can be stored in a sub-band memory in an orderly way.

As is characterized by a further embodiment as defined in claim 4, the picture memory and the sub-band memory may be advantageously built up in common. It is true that they can be maintained separately, because of the organization as described above, but they may advantageously be physically realized in one memory.

A further embodiment of the invention as defined in claim 5 provides the additional advantage that the sub-band data stored in a relevant transformation plane in the sub-band memory are retrievable from the sub-band memory already after termination of this transformation plane and before the start of the next transformation plane, so as to possibly further process these data.

The invention also relates to an arrangement for inverse transformation of picture data, particularly for inverse 2-D DWT as defined in claim 6. A similar structure as in the transformation arrangement according to the invention, defined in claim 1, is provided. There is also a sub-band memory and a picture memory, in which, before performing the inverse transformation, that sub-band of a picture to be retransformed is stored which was generated during the transformation as the last sub-band that was no longer to be transformed. Before performing the inverse transformation, all other sub-bands of the picture are stored in the sub-band memory. When the inverse transformation is being performed, the sub-bands stored in the sub-band memory are added, in the predetermined sequence and possibly using scaling factors, to the sub-band stored in the picture memory. The addition result generated in every new inverse transformation plane is written into the picture memory again so that data previously stored in this memory are overwritten.

The structure of the two memories in the arrangement thus also proves to be advantageous for an arrangement for inverse transformation.

These and other aspects of the invention are apparent from and will be elucidated with reference to the embodiments described hereinafter.

DESCRIPTION OF THE PREFERRED EMBODIMENTS

Figure 1:
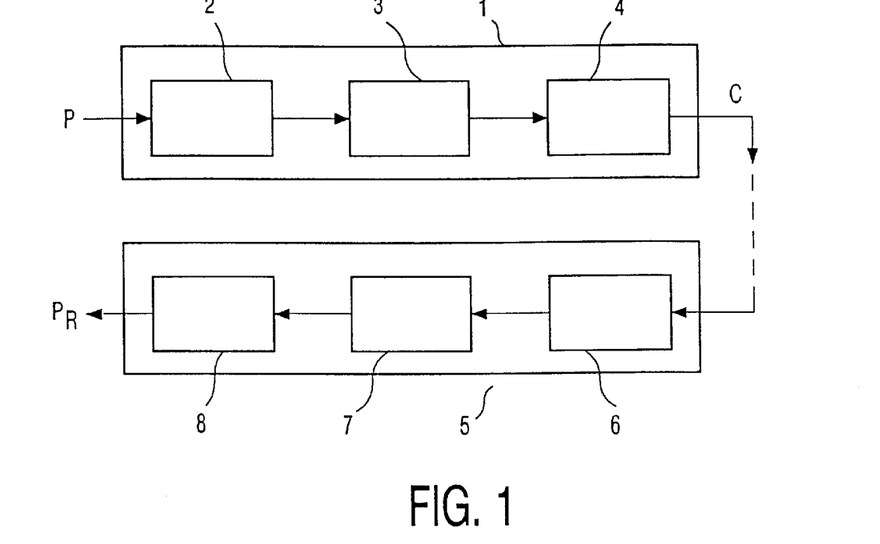
FIG. 1 is a sketch of a logic process of performing a 2-D DWT of a subsequent quantization and entropy encoding, as well as an inversion of these processes.

FIG. 1 is a diagrammatic representation elucidating the significance of 2-D DWT and the corresponding inverse transformation for generating compressed data. The block 1 in FIG. 1 comprises three processes to be elucidated hereinafter, leading to the data of an original picture P being converted into highly compressed data C. To this end, a 2-D DWT transformation symbolized in the Figure by the block 2 is first realized within the block 1. The picture is quasi-transformed into another basic system so as to perform a decorrelation of the picture information. This process is completely reversible and thus without loss. The actual data reduction is performed in the subsequent quantization which is symbolized by the block 3 in FIG. 1. The information content is then reduced. Finally, an entropy encoding symbolized by a block 4 is performed. A lossless coding of the quantized picture content is performed. Thus, the data stream is minimized without reducing the picture contents.

The decoder symbolized in the form of a block 5 in FIG. 1 operates in the reverse sense. After the encoded data stream has been decoded in a block 6, an inverse quantization is performed in a block 7 so that the original scaling is restored. The inverse transformation to be subsequently performed in a block 8 re-establishes the original basic system of the picture.

Figure 2:
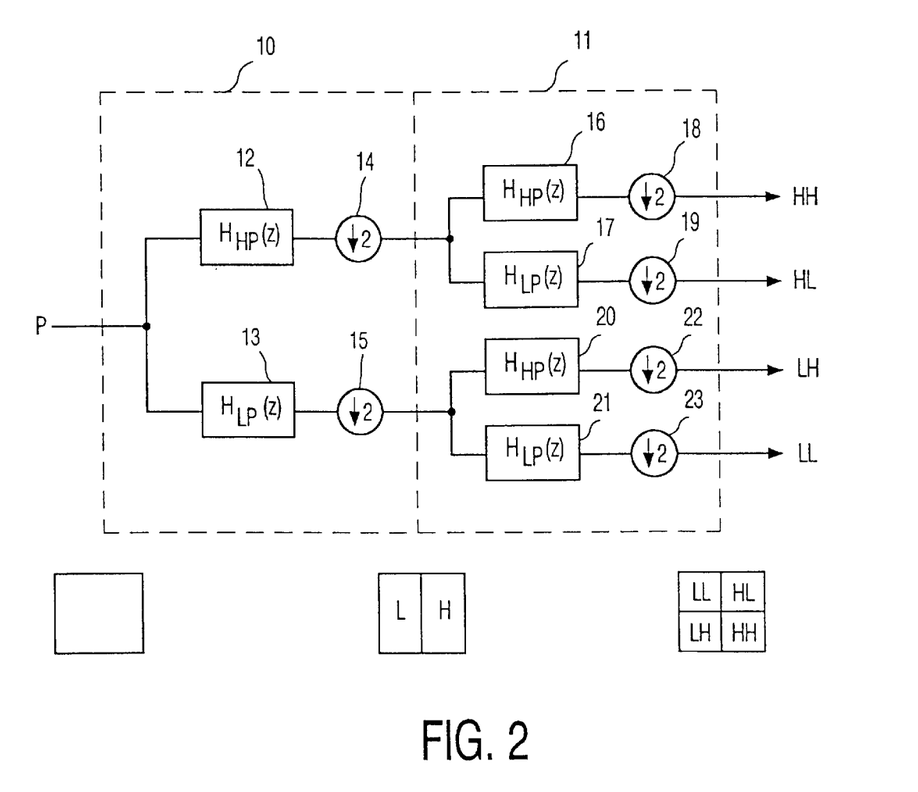
FIG. 2 is a block diagram to explain the processes in a 2-D DWT within a transformation plane.

FIG. 2 is a block diagram of the processes which are performed within a transformation plane of a two-dimensional Discrete Wavelet Transformation, 2-D DWT. The data of a picture or sub-band P to be transformed are applied to a first filter bank 10 in which a transformation is initially performed in one direction, for example the horizontal direction in FIG. 2. A subsequent second filter bank 11 filters in the opposite direction, thus in the vertical direction in the example of FIG. 1. Each filter stage comprises high-pass filters $H_{HP}$ and low-pass filters $H_{LP}$. In the first filter bank 10, a filtering operation in the horizontal direction is first performed, at which the picture is segmented into high-frequency and low-frequency portions. A high-pass filter 12 arranged in the first filter bank 11 generates the high-frequency portions, and a further low-pass filter 13 generates the low-frequency portions. The portions thus generated are subjected to a downsampling, for which purpose corresponding arrangements 14 and 15 are provided.

The low-frequency and high-frequency portions generated by means of the first filter stage are once more segmented into high-frequency and low-frequency portions in the second filter bank 11 in the vertical direction. Moreover, a downsampling by the factor of 2 is also performed in this case. The high-frequency portions supplied by the first filter bank 10 are once more segmented into high-frequency portions and low-frequency portions by means of a high-pass filter 16 and a low-pass filter 17, respectively. After downsampling arrangements 18 and 19, the sub-bands HH and HL are thus obtained. The first letter denotes the filtering in the horizontal direction and the second letter denotes the filtering in the vertical direction. Thus, these are the sub-bands which were first subjected to a high-pass filtering in the horizontal direction and subsequently to a high-pass filtering or low-pass filtering in the vertical direction.

In a corresponding manner, a further high-pass filter 20, a further low-pass filter 21 and two downsampling arrangements 22 and 23 are provided by means of which the sub-bands LH and LL are generated in a corresponding manner from the low-frequency portions supplied by the first filter bank 10.

After performing the transformation process in a transformation plane, as is shown in FIG. 2, an input data stream, which may be the original picture or blocks of the original picture or a sub-band or its blocks to be further segmented, has been segmented into four sub-bands HH, HL, LH and LL. In the 2-D DWT, the sub-bands HH, HL and LH are not further segmented but stored, which will hereinafter be further discussed. The sub-band LL, however, is further segmented in further transformation planes. The data of the sub-band LL in a transformation plane are thus again segmented into four sub-bands, as is shown in FIG. 2, of which the LL sub-band which is then newly generated may be further segmented in a subsequent transformation plane.

This transformation can be completely canceled at the decoder end, in that the transmitted and retransformed sub-bands are added one after the other to the LL band.

Figure 3:
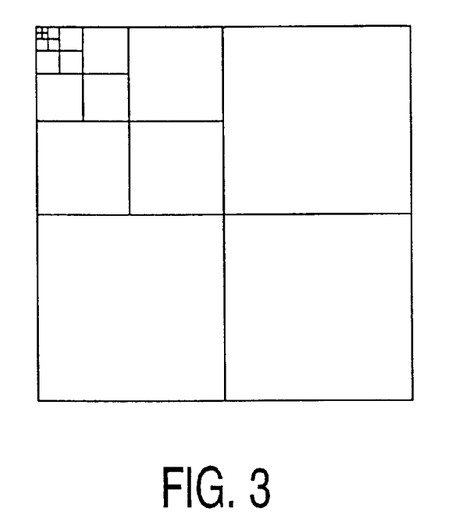
FIG. 3 is a diagrammatic representation of a Mallat tree.

The diagram in FIG. 3 shows the structure of the sub-bands obtained after performing the 2-D DWT in a plurality of transformation planes. The three large quadrants at the bottom left, bottom right and top right symbolize sub-bands generated in a first transformation plane, which sub-bands are not further segmented. After performing the 2-D DWT in the first transformation plane, a corresponding quadrant symbolizing the LL band generated in this transformation plane was also present in the upper left quadrant. However, in a further transformation plane, this LL band was segmented again. By downsampling, four quadrants were then obtained again, but each with half the side length as compared with the quadrants of the first transformation plane. Also after this transformation plane, the LL band then generated was further segmented.

FIG. 3 shows the data structure of the sub-bands obtained after a plurality of transformation planes.

The fact that the sub-bands occupy an increasingly smaller part of the transmitted data, is given by downsampling in each transformation plane. The arrangement according to the invention provides a simple architecture for performing a 2-D DWT in a possibly simple manner, in which a minimal number of data are to be copied to and fro during the transformation process and in which overall a minimal storage space is required. To achieve this, essentially two measures are taken, which will be elucidated with reference to FIGS. 4 and 5. A block segmentation of a picture or sub-band to be transformed is performed, as will be elucidated below with reference to FIG. 4. However, this segmentation into blocks according to the invention is performed within the arrangement in such a way that it causes no artefacts or a disturbance of the 2-D DWT process. FIG. 5 shows how the data of the picture or sub-band to be segmented and the sub-band data generated in a transformation plane can be optimally handled in the memories.

Figure 4:
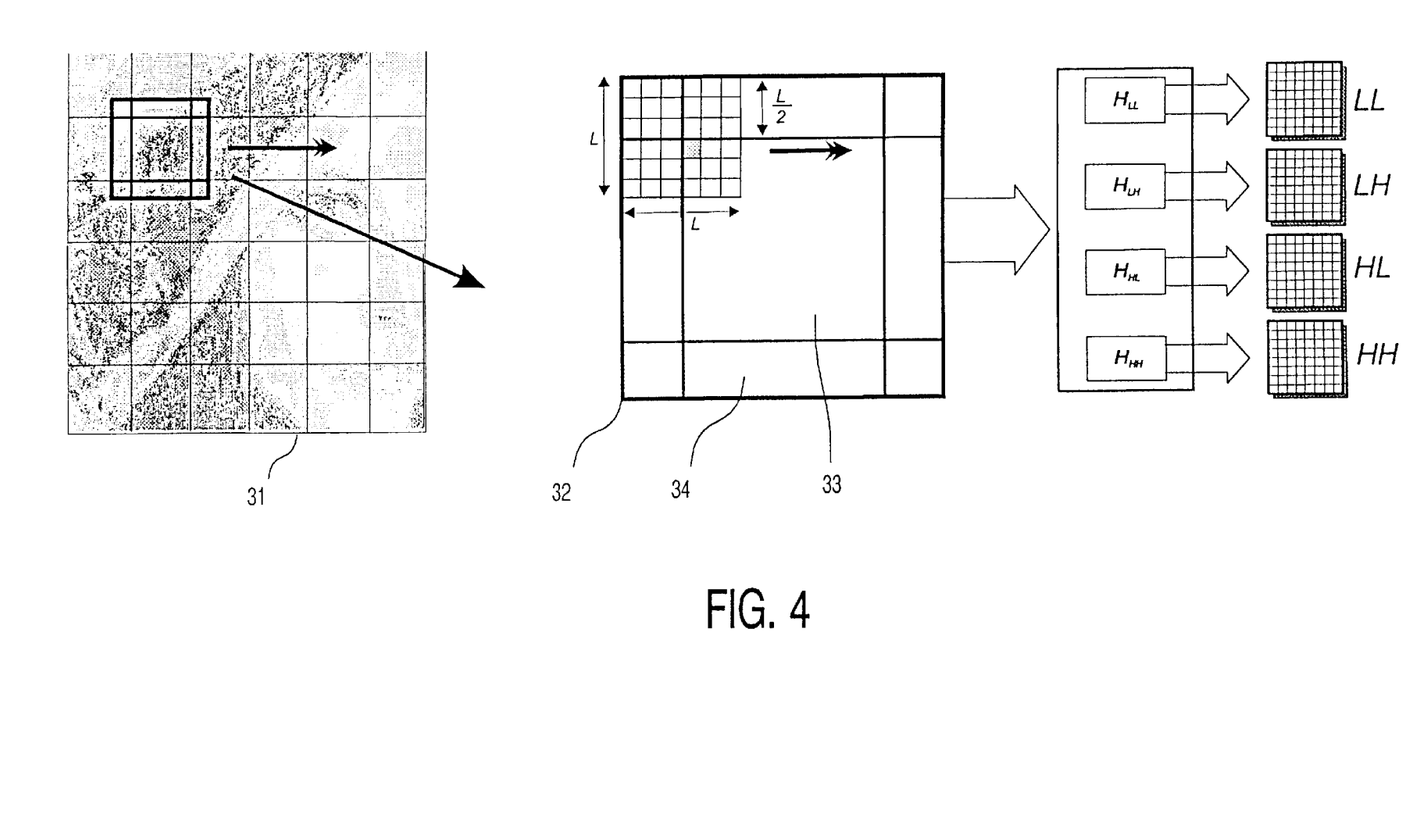
FIG. 4 shows diagrammatically a picture or sub-band to be transformed in blocks.
Figure 5:
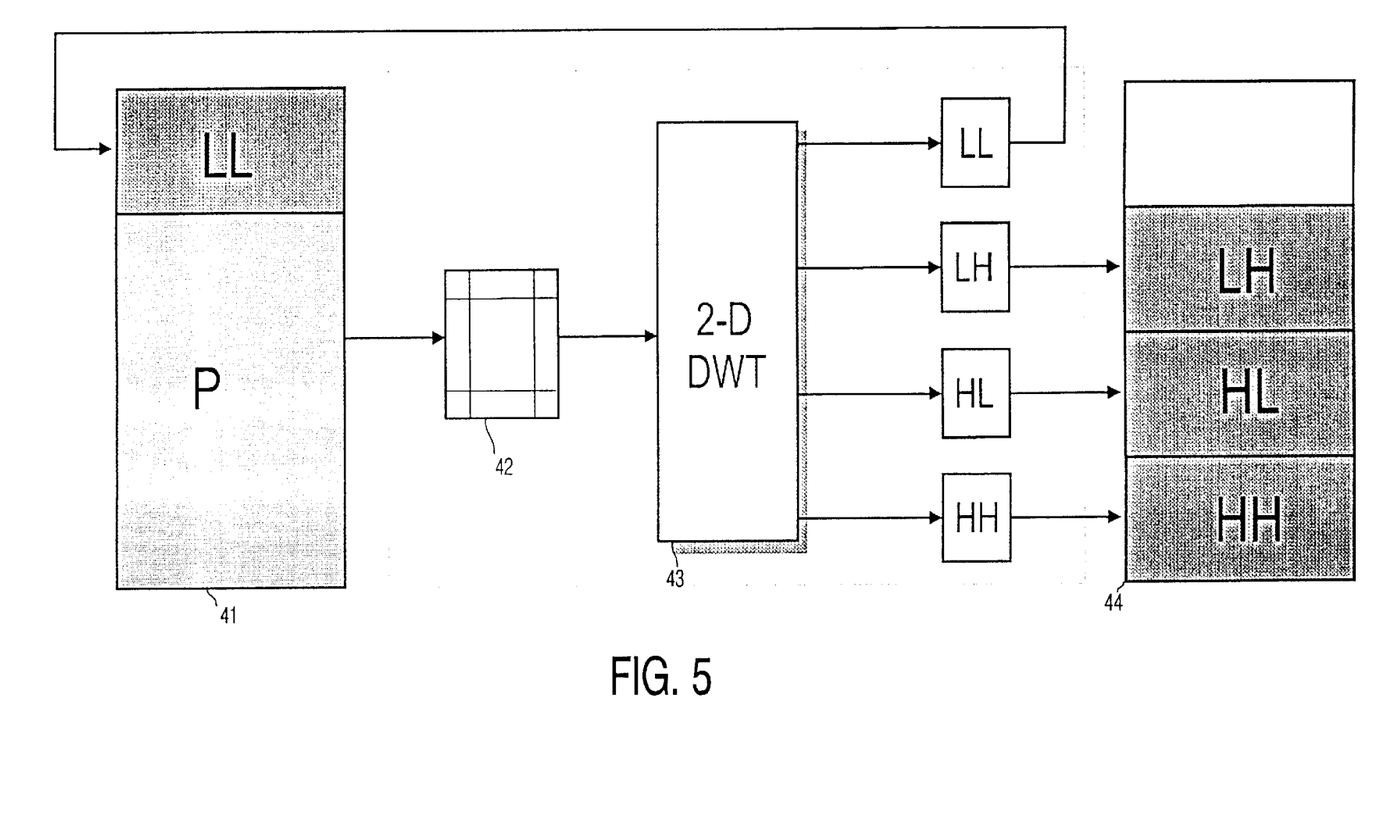
FIG. 5 shows diagrammatically the arrangement according to the invention, with two memories

FIG. 4 shows diagrammatically a block 31 which is a picture to be segmented but which may also be the data of a sub-band of a previous transformation plane. The block 31 is subdivided into n×m, in this example 6×6, square blocks which represent the basic blocks according to the invention.

In the arrangement according to the invention, a block-wise transformation of the data of the picture or sub-band 31 is performed in such a way that all data of the picture or sub-band 31 are segmented into basic blocks. This basic block structure is shown in the block 31. However, to prevent disturbances by the block structure in the 2-D DWT process of these blocks, each of these basic blocks is surrounded by a frame as is illustrated by way of a further block 32 shown in FIG. 4. The block 32 in FIG. 4 shows a basic block 33 and a frame 34 surrounding this block. The pixels of the basic block 33 are those which are to be subsequently subjected to a symbolically indicated 2-D, DWT process, in which process the sub-bands HH, HL, LH and LL are generated which may be further segmented in a further transformation plane.

However, to prevent disturbances by the block structure in the 2-D DWT of these pixels of the basic block 33, the basic block 33 is surrounded by a frame 34 which, in the vertical and horizontal direction adjacent to the basic block, has so many pixels that a 2-D DWT without disturbance of the pixels of the basic block is ensured. This is the case when the frame has a width of L/2, as is shown in the Figure. L is used as the filter depth of the filters used for the 2-D DWT. For example, in FIG. 2, the filters 12, 13, 14, 17, 20 and 21 have a maximum filter depth L. The width L/2 of the frame is then to be chosen in accordance with FIG. 4.

It is thereby achieved that the picture or sub-bands to be transformed in a plane is transformed into blocks without this block structure causing any negative effects, particularly artefacts. The memory space within the arrangement required for the transformation is minimal and it is not necessary to provide this arrangement with buffer memories which would require an additional number of components and could limit the transformation accuracy due to their limited memory size, while few data should be copied to and fro during the transformation process. Block 31 in FIG. 4 shows that the blocks are structured in the horizontal direction from left to right across the picture. These blocks are thus arranged in the form of a line. When the right picture edge is reached, a line is formed by a plurality of blocks in the subjacent area on the left. It is then important that the basic blocks of all these blocks cover all the pixels of the picture or sub-band to be transformed.

Due to the situation that the basic blocks are surrounded by the frames, parts of the picture contents are to be read more than once for transformation processes, but this is a relatively small drawback as compared with the advantage that every time only one part of the picture contents is to be transformed in a transformation process. The picture contents to be read more than once and the overlapping areas of the blocks will be further discussed with reference to FIG. 6.

The memory control or memory implementation within the arrangement according to the invention will hereinafter be elucidated with reference to FIG. 5.

The arrangement comprises a picture memory 41 in which the data of a picture P are stored before the start of the first transformation plane. These data are subjected to a block-wise transformation, in which a block with a basic block and a frame is denoted as block 42 in FIG. 5. In a circuit block 43 shown in FIG. 5, the 2-D DWT is subsequently performed in blocks. Each time, the four sub-bands HH, HL, LH and LL are generated, of which the sub-bands HH, HL and LH that are not to be further transformed in subsequent transformation planes are stored in a sub-band memory 44. However, a sub-band LL generated in the first transformation plane is stored in the picture memory 41 because this sub-band is to be further segmented in the subsequent transformation plane. However, parts of the picture data of the picture P are overwritten in the picture memory 41 because these data no longer need to be accessed in the second transformation plane. Thus, the advantage is obtained that the picture memory 41 should only be built up in such a way that it can take up the data of the picture P.

FIG. 5 thus shows the division of the data after the first transformation plane. The sub-bands HH, HL, LH of the first transformation plane are stored in the sub-band memory 44 and the sub-band LL to be further transformed is stored in the picture memory 41.

In a subsequent, second transformation plane, which is not shown in FIG. 5, new sub-bands HH, HL, LH generated in this transformation plane are stored in the still free storage space of the sub-band memory 44. It should be noted that due to the downsampling operation, which is a factor of 2 in the vertical and horizontal direction, these data have a correspondingly smaller size so that the still free memory space for the sub-band memory 44 in FIG. 5 is sufficient for the data of this transformation plane and all further transformation planes.

If the sub-band LL gained in the second transformation plane should be further segmented and subjected to a further transformation, it will again be stored in the picture memory 41. Parts of the data of the sub-band LL of the previous transformation plane are then overwritten again.

After performing the complete transformation of all desired transformation planes, the data of the sub-bands of the different transformation planes are available in an orderly manner in the sub-band memory 5. Before reading the data, a further re-assortment of the data of these sub-bands is thus not necessary. The data of the sub-band LL can be read from the picture memory 41.

Due to this kind of memory management, it has been achieved that a minimal memory space is required and that a regrouping of the data of the sub-bands is not necessary.

Figure 6:
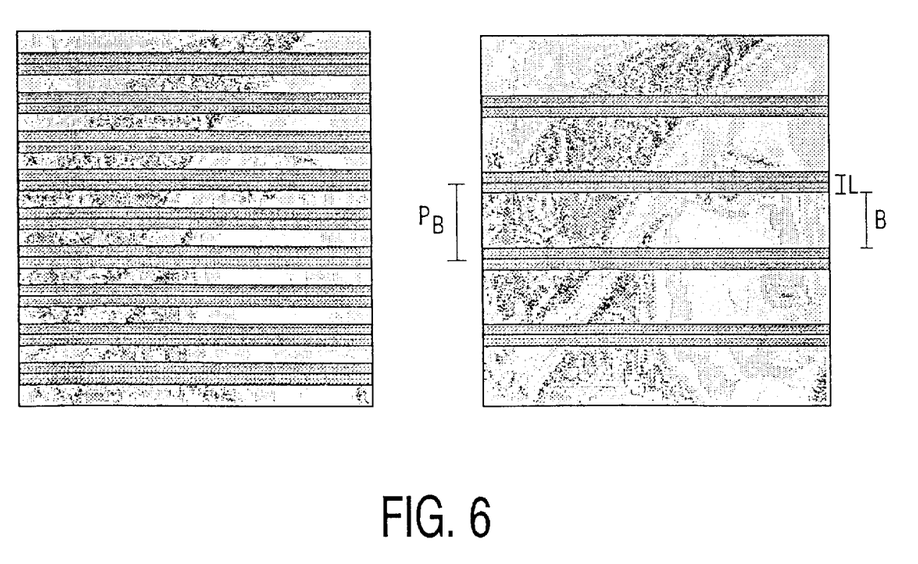
FIG. 6 is a diagrammatic representation to elucidate the overlapping areas of the blocks in dependence upon the block size.

FIG. 6 shows two frames which represent, for example, the picture data of a picture to be transformed. In the two frames, different block sizes have been chosen for the blocks. In the left frame, the blocks are chosen to be relatively small and in the right frame they are chosen to be relatively large. In the right frame in FIG. 6, the block size is denoted by $P_B$. The overall size of the blocks is concerned. That part of the blocks comprising the picture data to be transformed is characterized as B in FIG. 6. The frames surrounding the basic block in each block are chosen to be L/2 in accordance with FIG. 4 and their elucidation. When the block structure as shown in FIG. 4 is chosen to be in accordance with the block 31 shown in this Figure, then the data of these frames overlap each other, which is denoted by the range L in the right frame in FIG. 6, which are frames of neighboring blocks projecting into the neighboring block. Thus, those data areas are concerned which are doubly required for the neighboring blocks so that these data areas are to be read more than once in the 2-D DWT of the arrangement according to the invention, whereas all other data are to be read only once. In both frames in FIG. 6, these areas to be read more than once are shaded. FIG. 6 shows that these areas to be read more than once become smaller when the block size is chosen to be larger. However, in the case of a larger block size, the memory space required within the arrangement for performing the block-wise 2-D DWT is larger. Both factors should therefore be weighed against each other.

However, it should be noted that in spite of the areas to be read more than once, the memory space required for the block-wise 2-D DWT is clearly reduced.

In summary, it is to be noted that the arrangement according to the invention has considerable advantages as regards the required memory space, the regrouping and thus the bus load. An orderly storage of the sub-bands is realized so that they need not be regrouped, while there is no memory fragmentation. A minimal number of memory accesses and hence a minimal bus load is ensured. No additional memory space is required for the sub-band which is generated in a transformation plane and is to be further transformed. Due to the block-wise transformation, the number of memory accesses is clearly reduced as compared with the example of a twice complete application of the one-dimensional DWT. The block-wise transformation provides the possibility of processing arbitrary picture resolutions and minimally requires internal buffer size. In spite of the block-wise transformation, there is no deterioration of the picture quality due to additional edge distortions at block boundaries.

By simultaneously utilizing the memory organization elucidated with reference to FIG. 5 and the special realization of the 2-D DWT in blocks, a very efficient architecture of the arrangement for 2-D DWT has been realized.

What is claimed is:

1. An arrangement for transforming picture data while using a method of two-dimensional hierarchic sub-band segmentation, particularly a two-dimensional Discrete Wavelet Transformation (2-D DWT), in which the picture data, possibly in a plurality of planes, are segmented into sub-bands by means of filtering, characterized in that:

a picture memory (41) is provided in which the data of a picture are stored prior to the start of the first transformation plane and in which the data of a further sub-band to be transformed are stored after the first transformation plane, in which process the data of the picture are partially overwritten;

the data of a possible further sub-band to be segmented are stored in the picture memory (41) after every further transformation plane;

a sub-band memory (44) is provided in which, after a transformation process of a plane, the data gained during this transformation of those sub-bands which are no longer to be segmented in further transformation planes are stored, which data of said sub-band are stored adjacent to each other and in which sub-band data determined in previous transformation planes and possibly already stored in the sub-band memory (44) are not overwritten;

in the transformation planes, the data of the picture or the sub-band data stored in the last transformation plane are read from the picture memory, which data are read in blocks (32) comprising a basic block (33) having a size corresponding to the picture section or sub-band to be transformed, and a frame (34) surrounding said picture section and having a width corresponding to half the maximum filter depth of the filters (12, 13, 16, 17, 20, 21) used for the transformation;

all basic blocks (33) combined cover all pixels of the picture or sub-band data in the picture memory (41).

2. An arrangement as claimed in claim 1, characterized in that the blocks (32) in scanning lines cover the picture or sub-band stored in the picture memory (41) and to be transformed, the blocks (32) of juxtaposed scanning lines being directly adjacent to each other with their basic blocks (33).

3. An arrangement as claimed in claim 1, characterized in that a two-dimensional Discrete Wavelet Transformation (2-D DWT) is used, for which low-pass filters (13, 17, 21) and high-pass filters (12, 16, 20) are used for the sub-band segmentation, in that data, determined in a transformation plane, of an LL sub-band, to be further segmented in a subsequent transformation plane, are stored in the picture memory (41) and data of HH, HL and LH sub-bands which are not to be further segmented are stored in the sub-band memory (44), the data of the LL sub-band being gained by low-pass filtering in both dimensions, the data of the HH sub-band being gained by high-pass filtering in both dimensions, the data of the HL sub-band being gained by high-pass filtering in the horizontal direction and low-pass filtering in the vertical direction, and the data of the LH sub-band being gained by low-pass filtering in the horizontal direction and high-pass filtering in the vertical direction.

4. An arrangement as claimed in claim 1, characterized in that the picture memory (41) and the sub-band memory (44) are built up in common.

5. An arrangement as claimed in claim 1, characterized in that those sub-band data which are stored in the sub-band memory (44) after a transformation of a plane are released for further processing or transmission, hence are readable from the sub-band memory (44).

6. An arrangement for inverse transformation of picture data which are segmented while using a method of two-dimensional hierarchic sub-band segmentation, particularly a two-dimensional Discrete Wavelet Transformation (2-D DWT), in which pictures, possibly in a plurality of planes, are segmented into sub-bands by means of filtering, characterized in that;

a picture memory (41) is provided in which, before the inverse transformation, that sub-band of a picture to be transformed back is stored which was generated during the transformation as the last sub-band no longer to be further transformed;

a sub-band memory (44) is provided in which, before the inverse transformation, all other sub-bands of the picture are stored; and the sub-bands stored in the sub-band memory (44) are added consecutively, possibly while using scaling factors, to the sub-band stored in the picture memory (41) after performing the inverse transformation, while after each addition the sub-band previously stored in the first picture memory (41) or the previous addition result is overwritten by the new addition result.

* * * * *